United States Patent [19]
Spencer

[11] 3,715,100
[45] Feb. 6, 1973

[54] SUPPORT RACK FOR CAMPER BODIES

[75] Inventor: Calvin D. Spencer, Murray, Utah

[73] Assignee: Rax Corporation, Salt Lake City, Utah

[22] Filed: Feb. 16, 1971

[21] Appl. No.: 115,191

[52] U.S. Cl. ................................. 254/49, 214/515
[51] Int. Cl. ............................................. B66f 7/26
[58] Field of Search ............... 254/49; 214/38, 515

[56] References Cited

UNITED STATES PATENTS 3,202,304   8/1965   Lannen ........................ 254/49 X Primary Examiner—Othell M. Simpson
Attorney—B. Deon Criddle

[57] ABSTRACT

A support rack for camper bodies and the like, having pivotally interconnected parallelogram frames, frame locking means and flexible frame holding means. The parallelogram frames pivot within the limits of the flexible frame holding means to move a camper body onto and off of a truck bed as the truck is moved and the frame locking means hold the parallelogram frames rigid to support the camper body in an elevated position.

7 Claims, 7 Drawing Figures

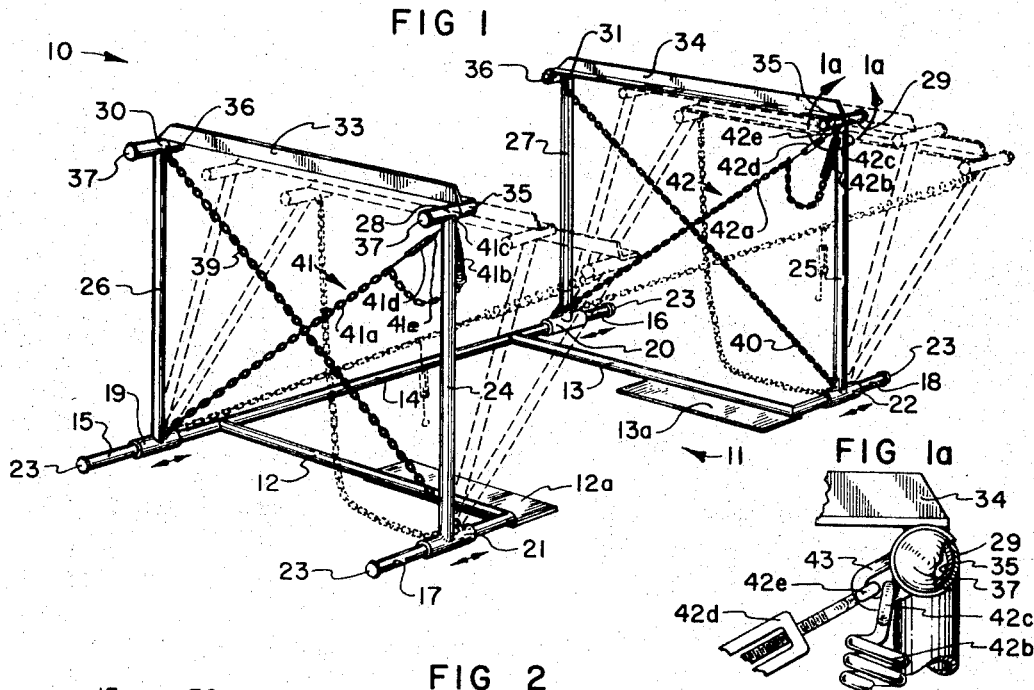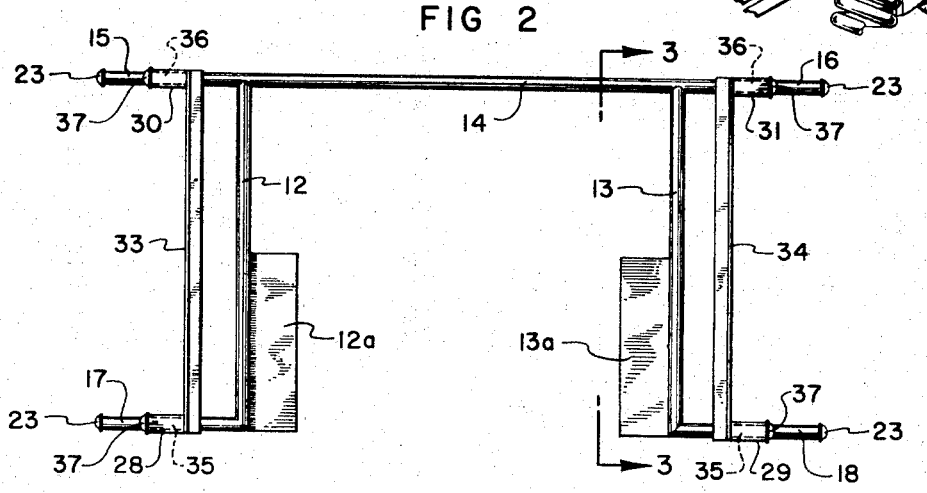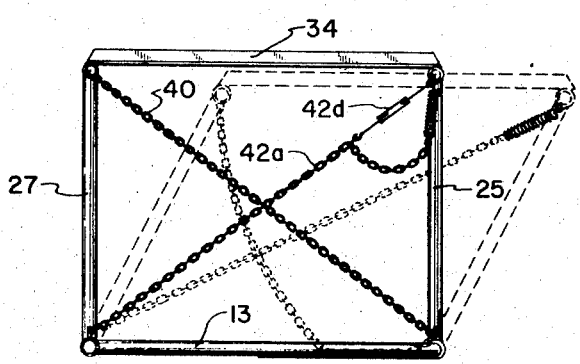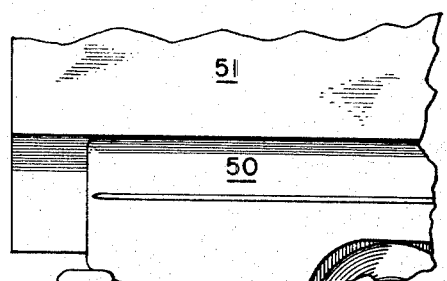

PATENTED FEB 6 1973

INVENTOR:
CALVIN D. SPENCER

BY:
B. Dean Criddle

ATTORNEY

SUPPORT RACK FOR CAMPER BODIES

BRIEF DESCRIPTION OF THE INVENTION

1. Field of the Invention

This invention relates to apparatus for moving camper bodies, modular load containing units and the like onto and off of truck beds and for supporting such camper bodies or units above the ground.

2. Prior Art

In recent years many devices have been developed to facilitate the placement of camper bodies on and the removal of such bodies from trucks. Some of these devices are made to become essentially integral components of the camper body. For example, racks may be mounted on the bottom of the camper body to cooperate with gear means on the truck as the camper body is moved on or off and legs or stands are fixed to the body for supporting it after removal. Similarly, cable and pulley systems have been devised to move camper bodies onto and off of a truck bed. Various types of jacking systems either built onto the camper body or separate therefrom have also been widely used to lift a camper body onto or off of a truck bed.

While these prior art devices have accomplished their desired objectives of moving and supporting camper bodies they have not always been entirely satisfactory. Many are quite expensive, some do not provide desired stability during use and some are subject to frequent part failure and mis-alignment of components and as a result, can be dangerous to use.

SUMMARY OF THE INVENTION

Principal objects of the present invention are to provide an apparatus which is relatively low in cost and that is reliable for use in easily and safely removing a camper body from or for positioning it on the bed of a truck. Another object is to provide an apparatus which can be used to safely support a camper body in an elevated position over an extended period of time. Still another object is to provide an apparatus with few moving parts which can be easily constructed and which will be relatively maintenance free and that does not require any motor or manually operated drive means to lift or pull the camper body. It is also an object to provide such an apparatus that can as well be used to lift, support, and lower other modular load carrying units or other such units, as may be mounted on trucks or other vehicles.

Principal features of the invention include a base that provides support for two upstanding frame structures. The base forms with each of the upstanding frame structure a pivoted parallelogram and comprises a pair of spaced parallel members, each having a rear connecting member secured to and extending transversely beyond one end and another transverse front member extending outwardly from the other ends of the spaced transverse members and parallel to the connecting member. The spaced parallel base members are separated by slightly more than the width of the truck bed with which the apparatus is to be used and an anchor plate, adapted to rest on the ground extends inwardly from each spaced parallel base member and along the members, whereby the rear wheels of the truck will rest thereon.

Equal length vertical support posts are slidably and pivotally connected to each base frame section. The posts may consist of pipe stanchions, welded perpendicularly to lower sleeves which slide over the projecting arms formed by the ends of the rear connecting member and the transverse front members of the base. The sliding connection allows the upright frames to be moved out and to thereafter be positioned adjacent to the sides of a truck and beneath the edges of a camper body regardless of the width of the camper. The pipe stanchions, also have upper sleeves welded to their tops parallel to the bottom sleeves. A rail having the same length as a parallel member and telescoping arms to fit into the upper sleeves interconnects the posts at each end of each parallel member. Caps on the ends of the telescoping arms keep them from being withdrawn from the upper sleeves. Each parallel member, with the upright posts at the end thereof and the rail connecting the tops of the posts thus forms a parallelogram framework, the members of which are all pivotally connected.

Chains extend from the lower front corner of each parallelogram framework diagonally across the parallelograms to their upper rear corner. These chains are fixed to the corners and are taut when the parallelogram frameworks are positioned as rectangles, i.e., with the posts normal to the parallel members beneath them and the rails above them. The chains thus prevent pivoting of the frame such that the rails move rearwardly with respect to the lower parallel members, but allow forward movement of the rails.

Other chain units extend from the lower rear corners of each parallelogram frame to the upper front corners. The chain units each include an adjustment means and a resilient means as components thereof, said adjustment means and said resilient means being arranged for alternative connection into use with the frames. When the adjustment means is used, it can be tightened to confine the chain unit to a diagonal length when the frame is rectangularly arranged. The rail of the frame is then held against forward movement with respect to the lower parallel member. As the adjustment means is released the rail can move forwardly and down with respect to the lower parallel member. When the resilient means is connected for use with the frames and the adjustment means is released, the rail can move forwardly and down with respect to the lower parallel member until all slack is taken up in the chain unit. Thereafter the rail can be moved further forward and down by stretching the resilient member.

The apparatus is operated entirely by truck movement and gravity and no motor or gear means is required to lift or lower a camper body.

Additional objects and features of the invention will become apparent from the following detailed description and drawings, disclosing what are presently contemplated as being the best modes of the invention.

THE DRAWINGS

FIG. 1 is a perspective view of the support rack of the invention, shown in solid lines and first and second lowered positions shown in dotted lines;

FIG. 1a, an enlarged vertical elevation view, taken within the line 1a—1a of FIG. 1;

FIG. 2, a top plan view of the rack;

FIG. 3, a vertical section taken on the line 3—3 of FIG. 2, with the first lowered position shown in dotted lines and with a truck bed and camper body shown fragmentarily on an approach to the rack;

FIG. 4, a rear view of the camper rack showing a truck with a camper body thereon moved between the upright frames of the rack and the vertical support members shown in solid lines in the position they are in as the truck is moved between them and in dotted lines after they have been moved beneath the edge of the camper body;

FIG. 5, a side view of the truck with camper body and of the rack positioned as shown in dotted lines in FIG. 4; and FIG. 6, a view like FIG. 5, but with the camper body raised from the truck bed by the rack.

DETAILED DESCRIPTION

Figure 4:
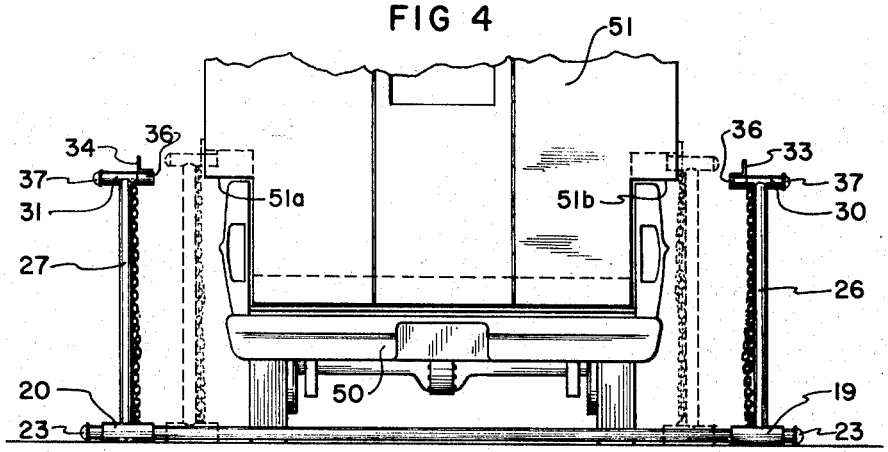
Figure 5:
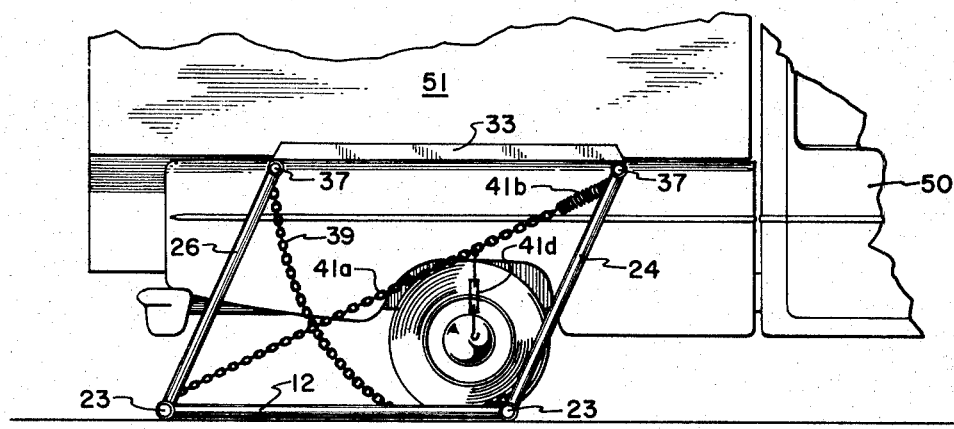
Figure 6:
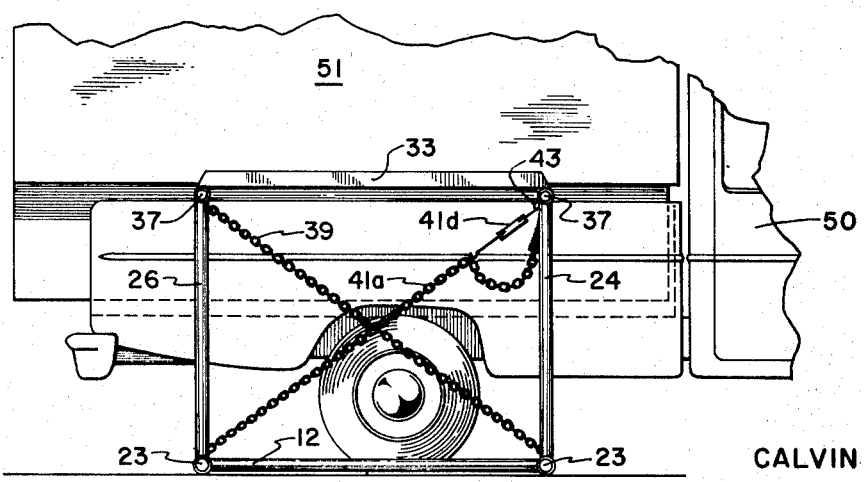

Referring now to the drawings:

In the illustrated preferred embodiment the rack 10 for camper bodies consists of a base shown generally at 11 having two spaced parallel base members 12 and 13 of equal length. The parallel members are preferably pipes and are joined by a connecting member 14 which is also preferably a pipe. Member 14 is connected across adjacent rear ends of the parallel members 12 and 13 and the ends of member 14 form base arms 15 and 16, extending beyond the parallel members. Other arms 17 and 18 are respectively connected to the other or forward ends of parallel base members 12 and 13 and extend parallel to the arms 15 and 16.

Sleeves 19, 20, 21 and 22 respectively surround arms 15, 16, 17 and 18 and an enlarged end cap 23, on the end of each of the arms holds the arms above the ground such that the sleeves can both reciprocate along the arms and pivot therearound when the base is positioned for use.

Plates 12a and 13a are respectively welded or otherwise affixed to the parallel members 12 and 13 and these plates extend inwardly and for a portion of the lengths of the parallel members. As will become more apparent, the plates provide for weight distribution, especially when a camper body is supported thereon; serve as guides for the rear wheels of a truck; and receive the wheels so that the rack is better stabilized during camper loading and unloading operations. Front posts or stanchions 24 and 25 are respectively fixed to and extend upwardly from the sleeves 21 and 22 and similar rear posts or stanchions 26 and 27 are respectively fixed to and extend upwardly from the sleeves 19 and 20. The posts 24, 25, 26 and 27 are all of the same length and can be solid or can be made of a suitable pipe material.

Sleeves 28, 29, 30 and 31 are respectively fixed to the tops of posts 24, 25, 26 and 27 and are essentially parallel to the sleeves 21, 22, 19 and 20.

Top rails 33 and 34 extend between the tops of posts 24 and 26 and 25 and 27, respectively and have parallel arms 35 and 36 at opposite ends thereof that extend through the sleeves on the tops of the posts. Caps 37 on the ends of the arms 35 and 36 help to keep the arms from sliding out of their sleeves. The sleeves are freely pivotable with respect to the arms 35 and 36. As shown, the rails 33 and 34 are each formed of a piece of angle iron with an upstanding outer portion and an inwardly extending load bearing portion on which a camper body is positioned. The structure described, thus includes two interconnected frameworks. Each framework has a fixed bottom member, upstanding parallel posts of equal length and an upper rail pivotally connected to the posts and extending parallel to the bottom member. A chain 39 extends diagonally with respect to each framework and is connected tautly between the lower front sleeve 21 and the upper rear sleeve 30 of one framework, a chain 40 is similarly tautly connected between the lower front sleeve 22 and the upper rear sleeve 31 of the other framework. Thus, the chains prevent movement of the rails 33 and 34 rearwardly with respect to base members 12 and 13 since any such rearward movement would increase the distance between the connected sleeves. The chains 39 and 40, being yieldable in compression, will not prevent movement of the rails forward with respect to the base members 12 and 13.

Chain units 41 and 42, respectively, interconnect rear bottom sleeve 19 with upper front sleeve 28 and rear bottom sleeve 20 with upper front sleeve 29.

Each chain unit includes a section of chain 41a, 42a; a spring 41b, 42b, connected to the chain and having a hook 41c, 42c, thereon; and a tension adjustment means comprising a turnbuckle 41d, 42d, connected at one end to the section of chain and at the other end to a hook 41e, 42e. The chain sections have one of their ends secured to the associated lower rear sleeve and both the associated spring and hook and adjustment means and hook secured to the other end. The hooks are attached to a ring 43 fixed to each of the upper sleeves and at least the hooks secured to the adjustment means are removable from their associated ring 43. The hooks on the springs can be permanently or removably connected to the ring 43, as desired, or can be semi-permanently attached.

As will become apparent, when the hooks 41e, 42e are connected to their associated rings 43 and the turnbuckles 41d, 42d are tightened to take up slack in the chain units the components of the framework are held substantially rigid in their upright position and the chain units act in the same manner as chains 39 and 40 to prevent undesired movement of the rails 33 and 34 with respect to the base members 12 and 13.

When the turnbuckles are operated to provide slack in the chain units and the hooks 41e and 42e are released from their associated rings 43, the rails 33 and 34 can be moved forward and down with respect to base members 12 and 13. If the hooks 41c and 42c are then connected to the rings 43, the movement of the rails will be limited to a first lowered position by the slack afforded by the chain sections and spring and hook means. For this purpose the springs 41b, 42b are selected to be strong enough to remain compressed or to yield only slightly under the weight of the frameworks. However, the rails can be physically pushed further down, thereby expanding the springs and when released the springs will move the framework back to its first lowered position.

The lengths of the posts 24–27 are such that the load bearing portions of rails 33 and 34 are above the overhang bottoms of a camper body mounted on a truck when the frameworks are in their upright positions. In addition, the lengths of the posts and of the chain, chain sections, springs and hooks is such that with the frameworks in the first lowered position the load bearing portions of the rails 33 and 34 are slightly above the elevation of the overhang bottoms. When physically forced down against the bias of the springs the load bearing portions move below the level of the overhang bottoms.

In operation the sleeves 19 and 21 are moved on arms 15 and 17 away from plate 12a and sleeves 20 and 22 are moved on arms 16 and 18 away from plate 13a. The upstanding frameworks are thus spread to allow a truck 50 having a camper body 51 thereon to back between them until the wheels of the truck are positioned on plates 12a and 13a, and the rails 33 and 34, positioned as hereinafter described are generally centered with respect to the camper body. The upstanding frameworks are then moved against the sides of the vehicle and camper body and the hooks 41e and 42e are disconnected from their rings 43, if they are at that time connected. Thereafter, the rails 33 and 34 are pushed down until the load bearing portions thereof are below the overhang bottoms 51a and 51b of the camper body, the framework is moved until the rails are beneath the overhang bottoms and the frameworks are released to allow the rails to move up into engagement with the bottom of the camper body.

Further backing of the truck 51 will then cause the posts 24-27 to rotate, inasmuch as it is easier for them to rotate about the sleeves 15, 16, 21 and 22 than it is for the heavy camper body to slide on the rails 33 and 34 and as they rotate, the frameworks lift the camper body from the bed of the truck. When the frameworks have reached their upright positions the chains 39 and 40 prevent further rotation and the hooks 41e and 42e can be connected to their rings 43 and the turnbuckles 41d and 42d can be operated to take slack out of the chain units before the truck is driven from beneath the camper body. With the rear wheels of the truck on the plates 12a and 13a during unloading, there is no way for the frameworks to move from beneath the camper body.

To place the camper body back on the truck it is only necessary to back the truck until the rear wheels are again properly positioned on plates 12a and 13a. Thereafter, the turnbuckles are operated to allow the camper body to be lowered with the rails 33 and 34 as they move forward and down, onto the truck bed. When the camper body is positioned on the truck bed the rails are forced further down, against the bias of springs 41b and 42b and the frameworks are moved away from the sides of the truck. On level ground the truck can be left out of gear and with all brakes released during loading. Thus, as the camper body is moved into place it may push the truck forward until the camper body is properly positioned.

While the use of chains is presently preferred, because of their strength in tension, yieldability in compression and costs, it should be apparent that cables or even ropes could be used. Also, while pipe structures and sleeves have been herein described, it should be obvious that other structural configurations to give the necessary strength reciprocation of frameworks and pivotability could also be used.

Furthermore, while springs are disclosed as components of the chain units it is only necessary that the rails be initially held against the overhang bottoms of the camper body as the posts move to their upright positions and such pressure could be applied manually or by other means, not shown.

Rollers or wheels, not shown, equipped with such braking means as may be necessary could also be provided to engage the ground and to make the assembly portable after loading and unloading, if desired.

While described as being used with camper bodies, the rack apparatus of the invention can also be used to lift other bodies having an overhang bottom extending outwardly beyond the sides of the truck or other transport vehicle.

Although a preferred form of my invention has been herein disclosed it is to be understood that the present disclosure is by way of example and that variations are possible without departing from the subject matter coming within the scope of the following claims, which subject matter I regard as my invention.

I claim:

1. A support rack for camper bodies and the like comprising
   a pair of spaced ground engaging base members;
   at least one upstanding post pivotally connected to each said ground engaging base member and extending upwardly to be at an elevation slightly above the overhang bottoms of a camper body mounted on a truck when said post is upright;
   a camper body engaging means pivotally connected at the top of each of said upstanding posts;
   means for maintaining said camper body engaging means substantially parallel to said base members during pivoting of said posts to a position below the elevation of the overhang bottoms;
   means for locking each said post in a generally upright position;
   means for holding the camper body engaging means against the overhanging bottoms of a camper body mounted on a truck; and
   means for resiliently holding the camper body engaging means against the overhang bottoms of a camper body mounted on a truck and positioned between the upstanding posts respectively fixed to the pair of spaced ground engaging members.

2. A support rack as in claim 1, wherein said means for resiliently holding the camper body engaging means against the overhang bottoms of a camper body also limits rotation of each upstanding post with respect to its base member.

3. A support rack as in claim 1, wherein the pair of spaced ground engaging members comprise parallel elongate members of equal length and wherein the at least one upstanding post comprises parallel posts pivotally connected for parallel movement to each end of the parallel members and further including a rear connecting member connected between one rear end of one said parallel member and the adjacent rear end of the other said parallel member.

4. A support rack as in claim 3, wherein the camper body engaging means comprises
   rails pivotally connected between the tops of the upstanding posts on front and rear ends of each parallel member, whereby said rails and said posts form upstanding parallelogram frameworks with their associated parallel members.

5. A support rack as in claim 4, wherein the means for locking each post in its generally upright position includes chains extending tautly across each of the frameworks from points adjacent to the lower ends of the posts at the fronts of the parallel members to points adjacent to the upper ends of the posts at the rear of the parallel members, when the posts are in their generally upright positions; and releasable chain means extending across each of the frameworks from points adjacent to the lower ends of the posts at the rear of the parallel members to points adjacent to the upper ends of the posts at the front of the parallel members, said releasable chain means including adjustment means for tightening said chain means to be taut when the posts are in their generally upright condition and for releasing said chain means whereby said posts can pivot forwardly with respect to said parallel members.

6. A support rack as in claim 4, wherein the chain means each includes spring means limiting rotation of the posts when the chain means is released.

7. A support rack as in claim 6, further including plate means fixed to each of the parallel base members and extending from the front of each of said members rearwardly thereof and arranged to be beneath the rear wheels of a truck backed between the frameworks.

* * * * *